Oct. 18, 1932.  I. H. FREESE  1,883,362
AUTOMATIC ROTARY LEER FEEDER
Original Filed Nov. 29, 1927   4 Sheets-Sheet 1

Inventor
Ira H. Freese.

By Eccleston & Eccleston
Attorneys

Oct. 18, 1932.  I. H. FREESE  1,883,362
AUTOMATIC ROTARY LEER FEEDER
Original Filed Nov. 29, 1927   4 Sheets-Sheet 4

Inventor
Ira H. Freese.
By Eccleston & Eccleston
Attorney

Patented Oct. 18, 1932

1,883,362

UNITED STATES PATENT OFFICE

IRA H. FREESE, OF CLARKSBURG, WEST VIRGINIA, ASSIGNOR TO HAZEL-ATLAS GLASS CO., OF WHEELING, WEST VIRGINIA, A CORPORATION OF WEST VIRGINIA

AUTOMATIC ROTARY LEER FEEDER

Original application filed November 29, 1927, Serial No. 236,524. Divided and this application filed November 29, 1927. Serial No. 236,523.

The invention relates particularly to mechanism for transferring glassware from the continuously traveling cross-conveyer of an annealing leer to the continuously traveling leer conveyer or leer pans. Various devices for this purpose have been proposed heretofore, and one of the objects of the present invention is to provide a leer feeder more efficient in operation and less complex in construction than those formerly known.

Another object of the invention is to provide a mechanism of this character which is very economical in operation.

A further object of the invention is to provide such a mechanism that will pemit the leer to be entirely closed at all times, except for the small opening through which the ware passes on the cross-conveyer.

Another object of the invention is to provide an apparatus of this character which, on the non-feeding stroke, will clear the incoming ware on the cross-conveyer, and which may be adjusted to make the return stroke at different heights.

The various advantages of the leer feeder will be apparent to those skilled in the art from the following detailed description, when taken in connection with the accompanying drawings; in which Figure 1 is a perspective view of the apparatus.

Figure 1:
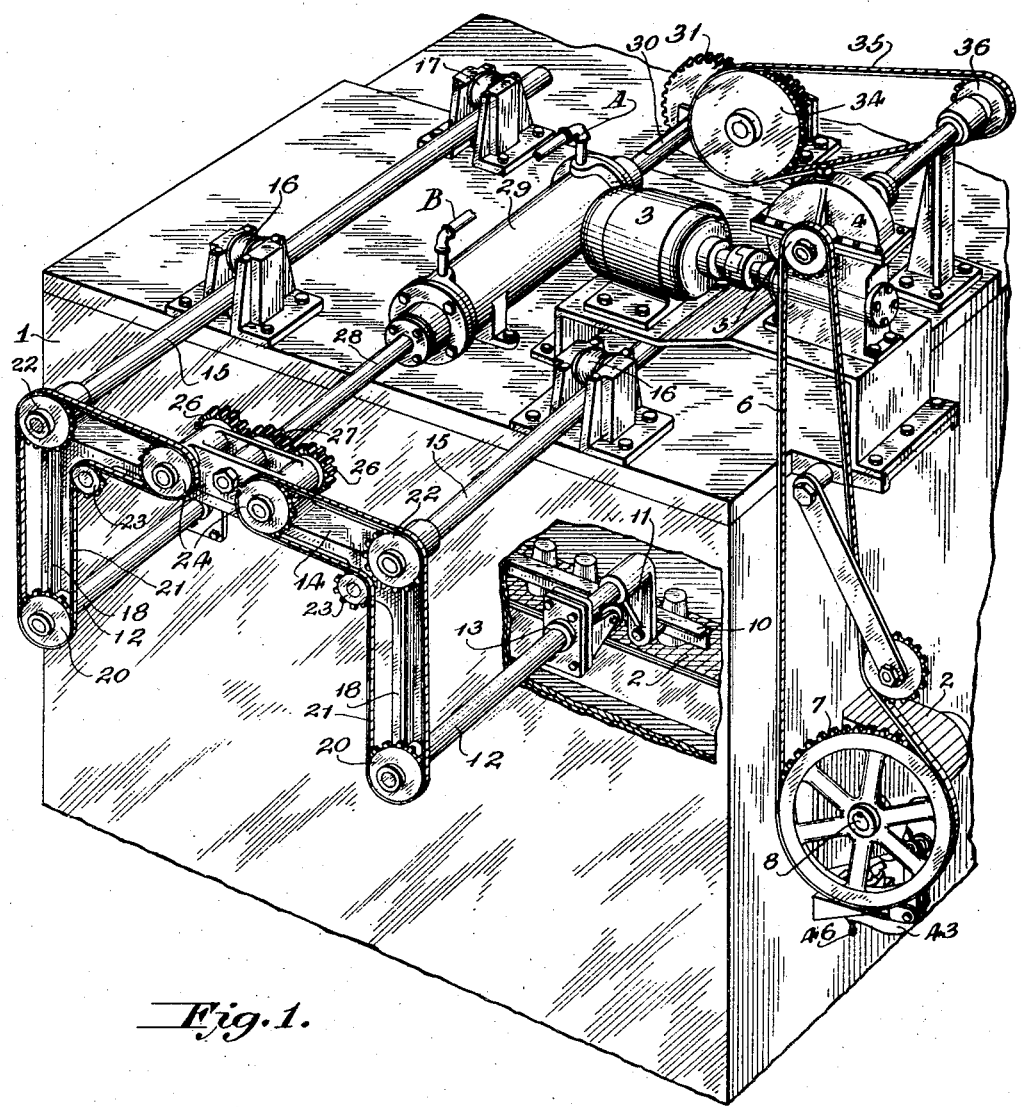
Figure 2:
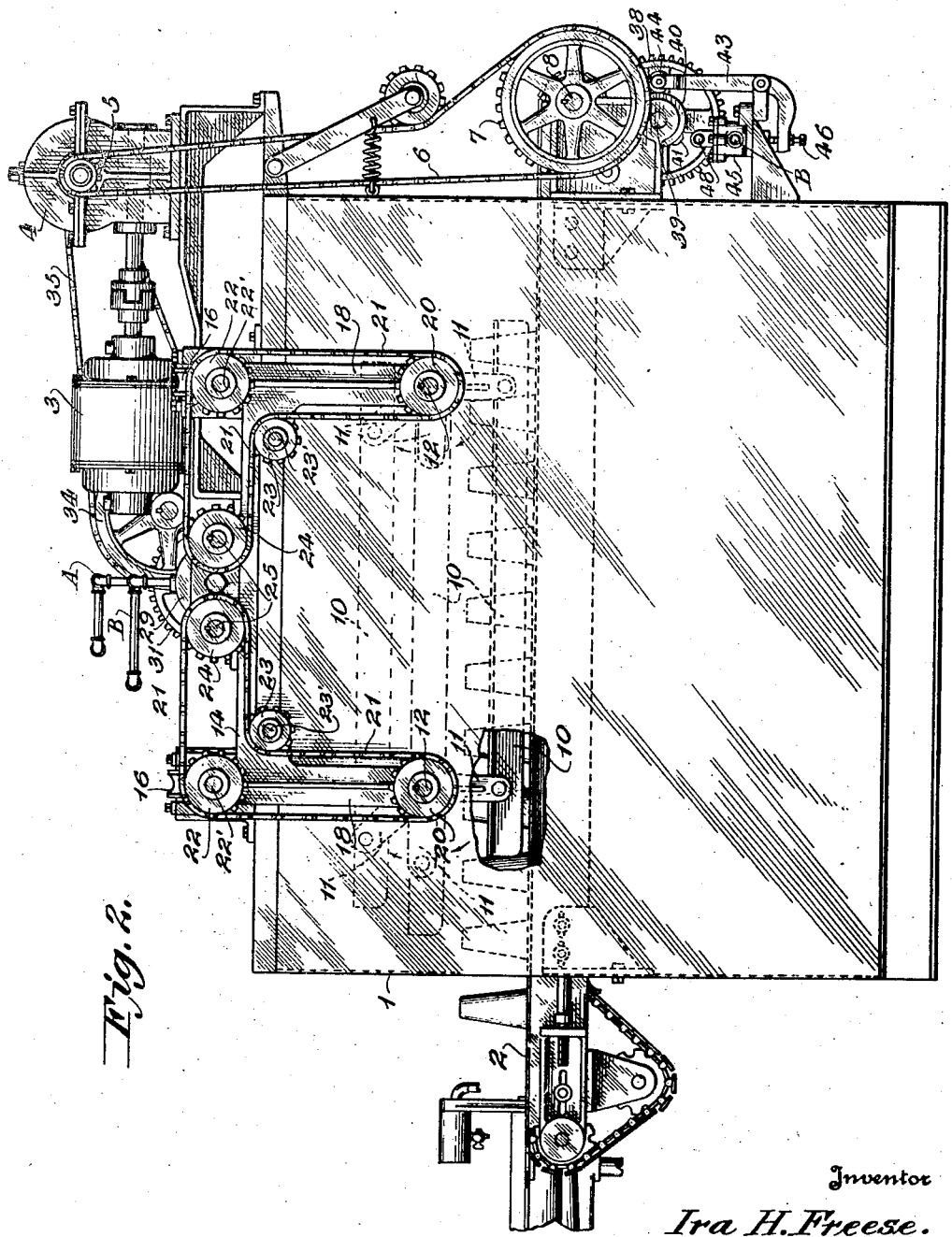
Figure 2 is a front view thereof.

Referring to the drawings more in detail, numeral 1 refers generally to any conventional glass annealing leer; which is provided with the usual cross-conveyer 2. The ware to be annealed may be placed on this conveyer by hand, or by any automatic mechanism, as for example, by the mechanism shown in my application Serial No. 236,524, filed November 29, 1927, of which this application is a division.

The cross-conveyor 2 is driven at the desired speed by any preferred means. In the present embodiment I employ a motor 3 which drives, through the reduction gearing 4, a small gear 5 connected by chain 6 with the large gear 7 keyed to the shaft 8 which is the driving shaft of the cross-conveyer.

The incoming ware travels along the cross-conveyer 2, and at the proper instant the stripper bar will make its feeding stroke to transfer the ware in its path, from the cross-conveyer, across the usual shadow pan 9, and onto the leer conveyer 9', which carries the ware slowly through the leer. During this feeding stroke, as well as at all other times, the stripper bar is slowly traveling in an orbital path, so that by the time the stripper bar is ready for its return or non-feeding stroke, it will be above the incoming ware on the cross-conveyer. The particular construction of the preferred means for accomplishing this operation will now be described; but it will be understood that this particular embodiment of the invention may be widely modified without departing from the spirit of the invention.

The stripper bar is indicated by numeral 10, and is attached, adjacent its ends, to rotating arms 11, 11, keyed to the constantly rotating shafts 12, 12. These shafts 12, 12, are slidably and rotatably mounted in bearings 13, 13, provided in the front wall of the leer. Numeral 14 refers generally to a bracket which is fixed to guide rods 15, 15, which are mounted for reciprocation between two pairs of guide rollers 16 and 17. Extending downwardly from the bracket 14 are two arms 18, 18, and these arms are provided adjacent their lower ends with suitable bearings in which the outer ends of the revolving stripper bar shafts 12, 12, are mounted. These shafts are held against longitudinal movement with respect to the arms 18 by any suitable means, as by reducing the diameter of the shafts to form shoulders 19; and there being a sprocket 20 fixed to the outer end of each of the stripper bar shafts beyond the arms 18.

The sprockets 20 which are fixed to the revolving stripper bar shafts, are continuously driven by chains 21. These chains pass over intermediate idlers 22 and 23 rotatably mounted on stub shafts 22' and 23' respectively, carried by the bracket 14, and thence over the driving sprockets 24. The sprockets 24 are fixed to short shafts 25 which pass through appropriate bearings in the bracket 14 and have fixed to their opposite ends the gears 26. Arranged between the gears 26 and meshing with both of these gears, is a gear 27 fixed to the shaft 28. The end of this shaft is journaled in any suitable thrust bearing in the bracket 14, so that the shaft by its rotation will drive the gears 26, and by its reciprocation will reciprocate the bracket 14.

The continuously rotating shaft 28 is also the piston rod of a cylinder 29, and this piston rod is reciprocated by the alternate admission of fluid pressure to the opposite ends of the cylinder, in the desired timed relation, by suitable mechanism to be described hereinafter. The continuously rotating piston rod 28 continues through and beyond the opposite end of the cylinder, and has its rear portion squared at 30 for the purpose of providing a sliding and driving connection with the gear 31. The gear 31 is provided with hubs which are mounted in suitable bearings 32, and extending through these hubs and the gear 31 is a squared passage which slidably receives the squared end portion 30 of the piston rod 28. For the purpose of continuously driving the gear 31 at the desired speed I provide a small gear 33 meshing therewith, and mounted on the same shaft with this small gear 33 is a large sprocket 34. This sprocket is driven by a chain 35 which also passes over a small sprocket 36 driven by the motor 3 through the reduction gearing 4.

All of the construction that remains to be described is the timing mechanism for controlling the operation of cylinder 29 which reciprocates the piston rod 28 and the bracket 14 attached thereto. In the specific construction disclosed herein the cross-conveyer driving shaft, which is driven by the sprocket 7, carries at its opposite end a small gear 37 meshing with a large gear 38 keyed to the timing shaft 39. This shaft carries two cams 40 and 40′ upon each of which is adjustably mounted a lobe 41; the lobe being rendered adjustably by any desired means, such as by cap screws 42.

Pivotally mounted adjacent the cams 40, 40′, are valve operating rocker arms 43, 43′, carrying rollers 44, 44′, which ride on the respective cams. Numeral 45 indicates a valve casing containing two conventional air valves, which are operated by adjustable pins 46, threaded in the lateral extensions of the rocker arms 43, 43′. The main air line is indicated by numeral 47, and this line has separate leads 48, 48′, to the two air valves; the main line being preferably provided with an air tank 49 to assist in the maintenance of a steady pressure. Leading from the valve on the right (Fig. 3) is a pipe A which transmits the fluid pressure to the right hand end of cylinder 29; and leading from the valve on the left (Fig. 3) is a pipe B which transmits the fluid pressure to the left hand end of cylinder 29.

In operation, the ware to be annealed is being carried continuously across the leer by the cross-conveyer 2, and the mechanism is so timed that the stripper bar will be operated to remove the ware from the cross-conveyer every time the cross-conveyer has traveled a certain distance; for example, every time the cross-conveyer has traveled six feet. It will be understood, of course, that such unit of travel is variable to suit different conditions or to suit leers of different sizes.

The motor 3 is continuously driving the shaft which carries the sprockets 5 and 36, and thus through the appropriate gearing hereinbefore described, the piston rod, the cross-conveyer driving shaft and the timing shaft, are all being continuously rotated. And it may be mentioned here that the train of gearing 5, 6, 37 and 38, corresponds to the train of gearing 36, 34, 33 and 31, so that for each complete revolution of the timing shaft there is a complete revolution of the piston rod and consequently a complete cycle of movement of the stripper bar.

Figure 3:
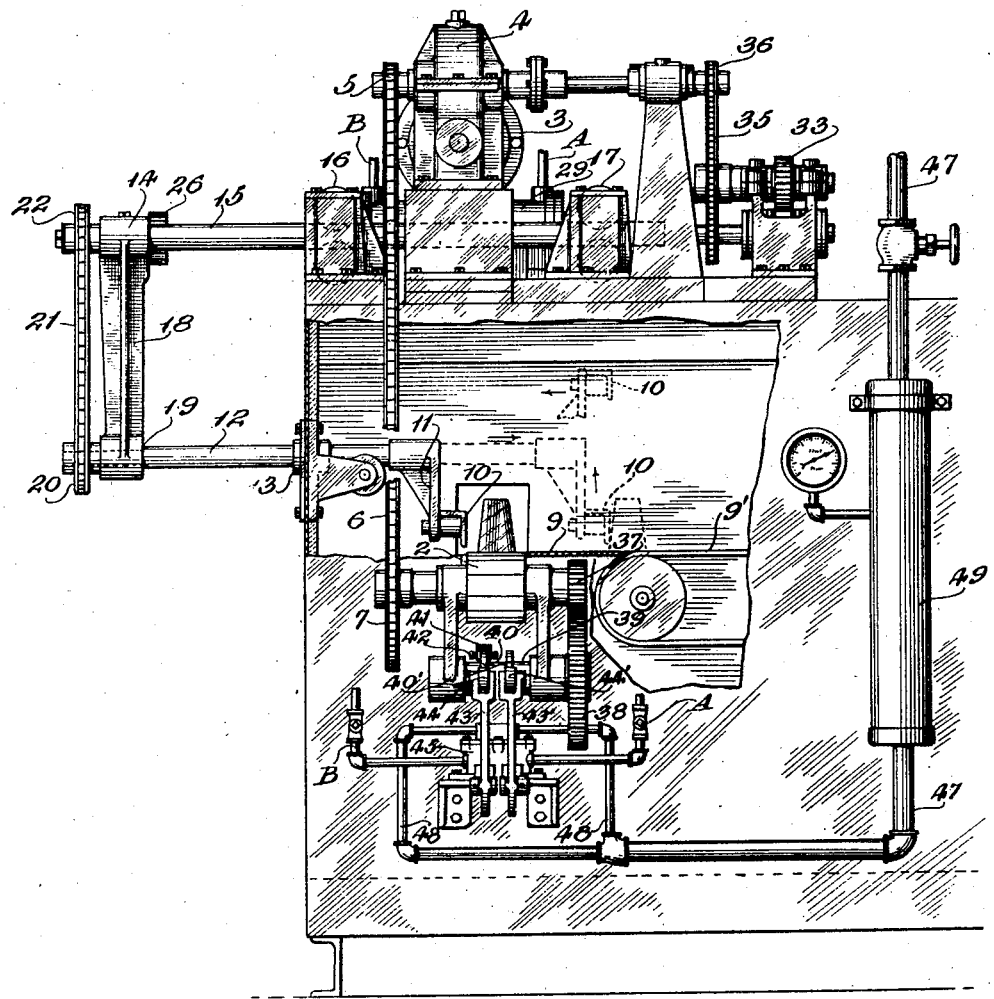
Figure 3 is a side view thereof.
Figure 4:
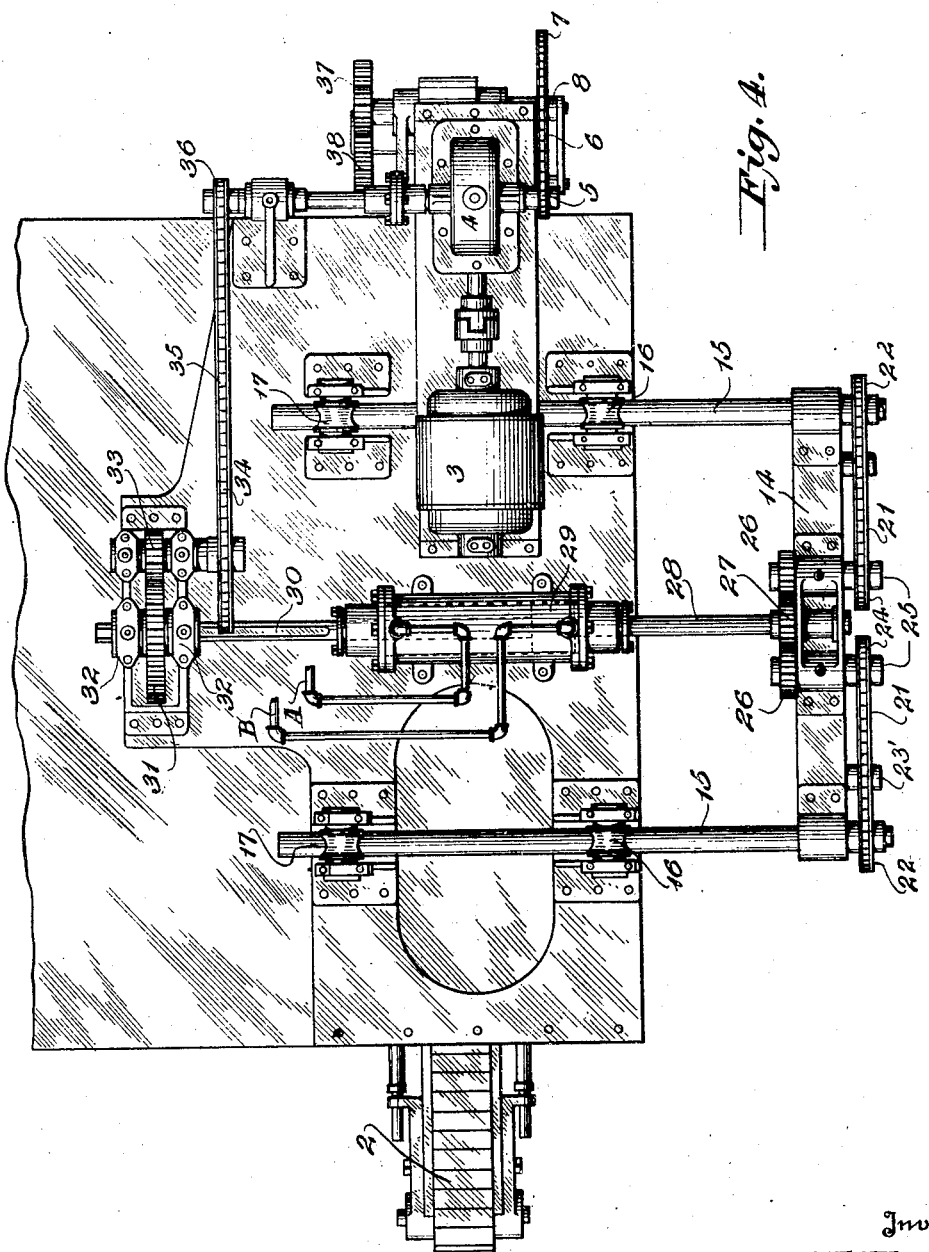
Figure 4 is a plan view thereof.

Assuming that the bracket 14, carrying the revolving stripper bar shafts, is in its withdrawn position as indicated in full lines in Figure 3, then when the continued rotation of these shafts brings the stripper bar to its lowermost position, rocker arm 43 will be operated by its cam, to open its air valve, thereby admitting air pressure, through pipe B, to the left hand end of the air cylinder 29 (Fig. 3). This admission of air pressure will cause the piston rod 28 to move to the right (Fig. 3) thereby effecting the feeding stroke of the bracket 14, shafts 12, and the stripper bar 10. By this feeding movement all of the ware on the cross-conveyer in front of the stripper bar, will be pushed off the cross-conveyer and across the usual shadow pan onto the leer conveyer; the parts now being in the lower dotted line position indicated in Figure 3. During this feeding stroke the stripper bar has continued its slow orbital movement, and this orbital movement continues, with the stripper bar at the end of its feeding stroke, until the stripper bar has reached a sufficient height to clear the ware which, in the meantime, has been carried into the leer, on the cross-conveyer. At this point the cam 40′ will operate the rocker arm 43′, by means of which its valve will be opened to admit fluid pressure to the right hand end (Fig. 3) of the cylinder 29, so that the piston rod will now be moved to the left, thereby effecting the non-feeding or return stroke of the bracket 14, shafts 12, and stripper bar 10. The parts are now back to the starting point as shown in full lines in Figure 3, with the exception that the stripper bar 10 is still in an elevated position. The continued rotation of the shafts 12 will bring the stripper bar to its lowermost position at the time when the cross-conveyer has traveled the desired unit of distance; and at this instant pressure will again be admitted to the left hand end of cylinder 29 through pipe B, to thereby start another cycle of operation.

It will be understood, of course, that the cams may be readily adjusted to cause the operation of cylinder 29 at any desired time; thus the mechanism may be adjusted to withdraw the stripper bar as soon as it has reached a height sufficient to clear the ware, or it may not be withdrawn until it has reached its upper limit, or in fact, it need not be withdrawn until it has started on its downward movement. And likewise, it is not essential that the stripper bar be at its lower limit at the commencement of the feeding stroke, for in the handling of some ware it may be preferable to apply the stripper bar thereto at some point above the bottom of the ware. It is also to be understood, that while I have shown the stripper bar as rotating in a clockwise direction, yet I have found it desirable, in some instances to rotate it counter-clockwise, so that it will move in the direction of the ware on the cross-conveyer 2. By suitable gearing and a clutch (not shown) the stripper bar may be caused to revolve in either direction, as desired.

From the foregoing description it will be apparent that the device is extremely simple in construction, possesses a higher degree of flexibility than previously known leer feeders, is both economical and efficient in operation, and practically eliminates the loss of leer heat.

While I have described in considerable detail the preferred construction, it will be apparent that the invention is subject to many changes and modifications, all of which I aim to include within the scope of the appended claims.

What I claim is:

1. A leer feeder including a cylinder and piston rod, a stripper bar, operative connections between the piston rod and stripper bar, and means for rotating said piston rod to impart continuous orbital movement to said stripper bar, said cylinder intermittently reciprocating the piston rod to move the stripper bar back and forth.

2. A leer feeder including a cylinder and a piston rod, a stripper bar, operative connections between the piston rod and stripper bar, means for continuously rotating the piston rod to impart continuous orbital movement to the stripper bar, said cylinder intermittently reciprocating the piston rod to move the stripper bar back and forth, valves for controlling the alternate admission of operating fluid to opposite ends of said cylinder, and adjustable timing means for operating said valves.

3. A leer feeder including a cylinder and a piston rod, a stripper bar, operative connections between the piston rod and stripper bar, means for continuously rotating the piston rod to impart continuous orbital movement to the stripper bar, said cylinder intermittently reciprocating the piston rod to move the stripper bar back and forth, valves for controlling the alternate admission of operating fluid to opposite ends of said cylinder, a timing shaft, and adjustable cams carried by the timing shaft and operating said valves.

4. A leer having a closed front, a pair of continuously rotating shafts reciprocably mounted in the leer front, a stripper bar carried by said shafts, means for continuously rotating said shafts, and means for reciprocating said shafts.

5. A leer feeder including a bracket, a shaft rotatably mounted in said bracket, a stripper bar carried by said shaft, a cylinder, a piston rod extending through both ends of said cylinder, one end of said piston rod connected with the bracket, a gear mounted on the opposite end of the piston rod, and having a sliding connection therewith, a motor, driving connections between the motor and said gear, valve mechanism for controlling the operation of said cylinder, a timing shaft for operating the valves, and a driving connection between the motor and the timing shaft.

6. A leer feeder including a stripper bar, a cylinder, a piston rod operatively connected with the stripper bar, valves controlling the operation of said cylinder, a timing shaft for operating the valves, a motor for driving the timing shaft, and a connection between the motor and the piston rod for rotating the latter.

7. A leer feeder including a stripper bar, a continuously revolving member supporting the stripper bar and causing the latter to continuously travel in an orbital path, said member revolving about a horizontal axis, means for continuously revolving said member, and means for reciprocating said member.

8. A leer feeder for transferring glassware to a leer, including a stripper bar, continuously revolving means supporting the stripper bar and causing said bar to continuously travel in an orbital path, the lower limit of the orbit being below the top of the ware being transferred, and the upper limit of the orbit being above the top of such ware, and means for reciprocating the continuously revolving means.

9. A leer feeder for transferring glassware to a leer, including a stripper bar, continuously revolving means supporting the stripper bar and causing said bar to continuously travel in an orbital path, the lower limit of the orbit being below the tops of the ware being transferred, and the upper limit of the orbit being above the tops of such ware, said bar having a feeding stroke toward the leer and a non-feeding stroke away from the leer, and means for effecting the non-feeding stroke when the bar is at any desired position in its orbital travel.

10. A leer feeder for transferring glassware to a leer, including a stripper bar, continuously revolving means supporting the stripper bar and causing said bar to continuously travel in an orbital path, the lower limit of the orbit being below the tops of the ware being transferred, and the upper limit of the orbit being above the tops of such ware, said bar having a feeding stroke toward the leer and a non-feeding stroke away from the leer, and means for effecting the feeding stroke when the bar is at any desired position in its orbital travel.

11. A leer feeder for transferring glassware to a leer, including a stripper bar, continuously revolving means supporting the stripper bar and causing said bar to continuously travel in an orbital path, the lower limit of the orbit being below the tops of the ware being transferred, and the upper limit of the orbit being above the tops of such ware, said bar having a feeding stroke toward the leer and a non-feeding stroke away from the leer, and a timing shaft for effecting the feeding stroke when the bar is at any desired position in its orbital travel.

IRA H. FREESE.